US012639573B2

(12) United States Patent
Li et al.

(10) Patent No.: US 12,639,573 B2
(45) **Date of Patent: *May 26, 2026**

(54) METHOD, SYSTEM, AND COMPUTER PROGRAM PRODUCT FOR EMBEDDING COMPRESSION AND REGULARIZATION

(71) Applicant: Visa International Service Association, San Francisco, CA (US)

(72) Inventors: Haoyu Li, Columbus, OH (US); Junpeng Wang, Santa Clara, CA (US); Liang Wang, San Jose, CA (US); Yan Zheng, Los Gatos, CA (US); Wei Zhang, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 18/656,024

(22) Filed: May 6, 2024

(65) Prior Publication Data

US 2024/0289613 A1 Aug. 29, 2024

Related U.S. Application Data

(63) Continuation of application No. 18/027,028, filed as application No. PCT/US2022/047409 on Oct. 21, 2022, now Pat. No. 11,995,548.

(Continued)

(51) Int. Cl.
*G06N 3/08* (2023.01)
*G06N 3/0455* (2023.01)

(52) U.S. Cl.
CPC ............. *G06N 3/08* (2013.01); *G06N 3/0455* (2023.01)

(58) Field of Classification Search
CPC ........ G06N 3/08; G06N 3/0455; G06N 3/047; G06N 3/0475; G06N 3/088
See application file for complete search history.

(56) References Cited

U.S. PATENT DOCUMENTS

2017/0357896 A1 12/2017 Tsatsin et al.
2018/0165554 A1 6/2018 Zhang et al.
(Continued)

FOREIGN PATENT DOCUMENTS

| CN | 112668690 A | 4/2021 |
| CN | 112771541 A | 5/2021 |
| CN | 113052309 A | 6/2021 |

OTHER PUBLICATIONS

Eastwood C, Williams CK. A framework for the quantitative evaluation of disentangled representations. In6th International Conference on Learning Representations May 3, 2018. (Year: 2018).*

(Continued)

*Primary Examiner* — Oluwatosin Alabi
(74) *Attorney, Agent, or Firm* — The Webb Law Firm

(57) ABSTRACT

A method, system, and computer program product is provided for embedding compression and reconstruction. The method includes receiving embedding vector data comprising a plurality of embedding vectors. A beta-variational autoencoder is trained based on the embedding vector data and a loss equation. The method includes determining a respective entropy of a respective mean and a respective variance of each respective dimension of a plurality of dimensions. A first subset of the plurality of dimensions is determined based on the respective entropy of the respective mean and the respective variance for each respective dimension of the plurality of dimensions. A second subset of the plurality of dimensions is discarded based on the respective entropy of the respective mean and the respective variance for each respective dimension of the plurality of dimensions.

(Continued)

200

The method includes generating a compressed representation of the embedding vector data based on the first subset of dimensions.

18 Claims, 7 Drawing Sheets

Related U.S. Application Data

(60) Provisional application No. 63/270,321, filed on Oct. 21, 2021.

(56) References Cited

U.S. PATENT DOCUMENTS

| | | | |
|---|---|---|---|
| 2020/0310370 A1 | 10/2020 | Bogo et al. | |
| 2020/0395117 A1 | 12/2020 | Schnorr | |
| 2021/0089884 A1 | 3/2021 | Macready et al. | |
| 2021/0271980 A1 | 9/2021 | Polykovskiy et al. | |
| 2022/0147818 A1* | 5/2022 | Zhang | G06N 3/0499 |
| 2022/0277192 A1* | 9/2022 | Gou | G06N 3/0464 |
| 2022/0385907 A1* | 12/2022 | Zhang | H04N 19/172 |
| 2023/0169325 A1 | 6/2023 | Xie et al. | |
| 2023/0378976 A1* | 11/2023 | Mizutani | H04Q 9/00 |

OTHER PUBLICATIONS

Wei R, Garcia C, El-Sayed A, Peterson V, Mahmood A. Variations in variational autoencoders—a comparative evaluation. Ieee Access. Aug. 20, 2020;8:153651-70. (Year: 2020).*

Tang Y, Chen D, Li X. Dimensionality reduction methods for brain imaging data analysis. ACM Computing Surveys (CSUR). May 3, 2021;54(4):1-36. (Year: 2021).*

Dahl, Joakim. "Analysis of the effect of latent dimensions on disentanglement in Variational Autoencoders." (2021). (Year: 2021).*

Abdella, A statistical comparative study on image reconstruction and clustering with novel VAE cost function, IEEE Access, 2020, pp. 25626-25637.

Burgess et al., "Understanding disentangling in B-VAE", 31st Conference on Neural Information Processing Systems, arXiv:1804.03599v1, 2017, pp. 1-11.

Camacho-Collados et al., "SemEval-2017 Task 2: Multilingual and Cross-lingual Semantic Word Similarity", Proceedings of the 11th International Workshop on Semantic Evaluations (SemEval-2017), 2017, pp. 15-26.

Dewangan et al., "Fault Diagnosis of machines using deep convolutional beta-variational autoencoder", IEEE Transaction on Artificial Intelligence, 2021, pp. 287-296, vol. 3, No. 2.

Higgins et al., "B-VAE: Learning Basic Visual Concepts With a Constrained Variational Framework", 5th International Conference on Learning Representations, ICLR 2017—Conference Track Proceedings, 2017, pp. 1-13.

Higgins et al., "Scan: Learning hierarchical compositional visual concepts", arXiv:1707.03889, 2018, pp. 1-24.

Huang et al., "Multi-lingual Common Semantic Space Construction via Cluster-consistent Word Embedding", arXiv:1804.07875v1, 2018, pp. 1-18.

Inselburg et al., "Parallel Coordinates: A Tool for Visualizing Multi-Dimensional Geometry", Proceedings of the First IEEE Conference on Visualization, 1990, pp. 361-378.

Ji et al., "Visual Exploration of Neural Document Embedding in Information Retrieval: Semantics and Feature Selection", IEEE Transactions on Visualization and Computer Graphics, 2019, pp. 1-12, vol. 25, No. 6.

Kingma et al., "Auto-Encoding Variational Bayes", arXiv:1312.6114v10, 2014, pp. 1-14.

Li et al., "EmbeddingVis: A Visual Analytics Approach to Comparative Network Embedding Inspection", IEEE Conference on Visual Analytics Science and Technology (VAST), arXiv:1808.09074v1, 2018, pp. 1-12.

Liu et al., "Visual Exploration of Semantic Relationships in Neural Word Embeddings", IEEE Transactions on Graphics and Visualization, 2017, pp. 553-562.

Liu et al., "Latent Space Cartography: Visual Analysis of Vector Space Embeddings", Eurographics Conference on Visualization (EuroVis), 2019, pp. 67-78, vol. 38, No. 3.

Mikolov et al., "Exploiting Similarities among Languages for Machine Translation", arXiv:1309.4168v1, 2013, pp. 1-10.

Mohiuddin et al., "LNMap: Departures from Isomorphic Assumption in Bilingual Lexicon Induction Through Non-linear Mapping in Latent Space", arXiv:2004.13889v2, 2020, pp. 1-12.

Ruder et al., "A Survey of Cross-lingual Word Embedding Models", Journal of Artificial Intelligence Research, arXiv:1706.04902v4, 2019, pp. 569-631, vol. 65.

Sinha et al., "Variational Autoencoder Anomaly-Detection of Avalanche Deposits in Satellite SAR Imagery", Association for Computing Machinery, 2020, pp. 113-119.

Tang et al., "Dimensionality Reduction Methods for Brain Imaging Data Analysis", ACM Computing Surveys, 2021, pp. 1-36, vol. 54, No. 4.

Ulger et al., "Anomaly Detection for Solder Joints Using B-VAE", IEEE Transactions on Components, Packaging and Manufacturing Technology, 2021, pp. 2214-2221, vol. 11, No. 12.

Voigt et al., "The EU General Data Protection Regulation (GDPR): A Practical Guide", 2017, 1st Ed., Cham: Springer International Publishing, Cham, Switzerland.

Wang et al., "SCANViz: Interpreting the Symbol-Concept Association Captured by Deep Neural Networks through Visual Analytics", IEEE Pacific Visualization Symposium (PacificVis), 2020, pp. 51-60.

* cited by examiner

200

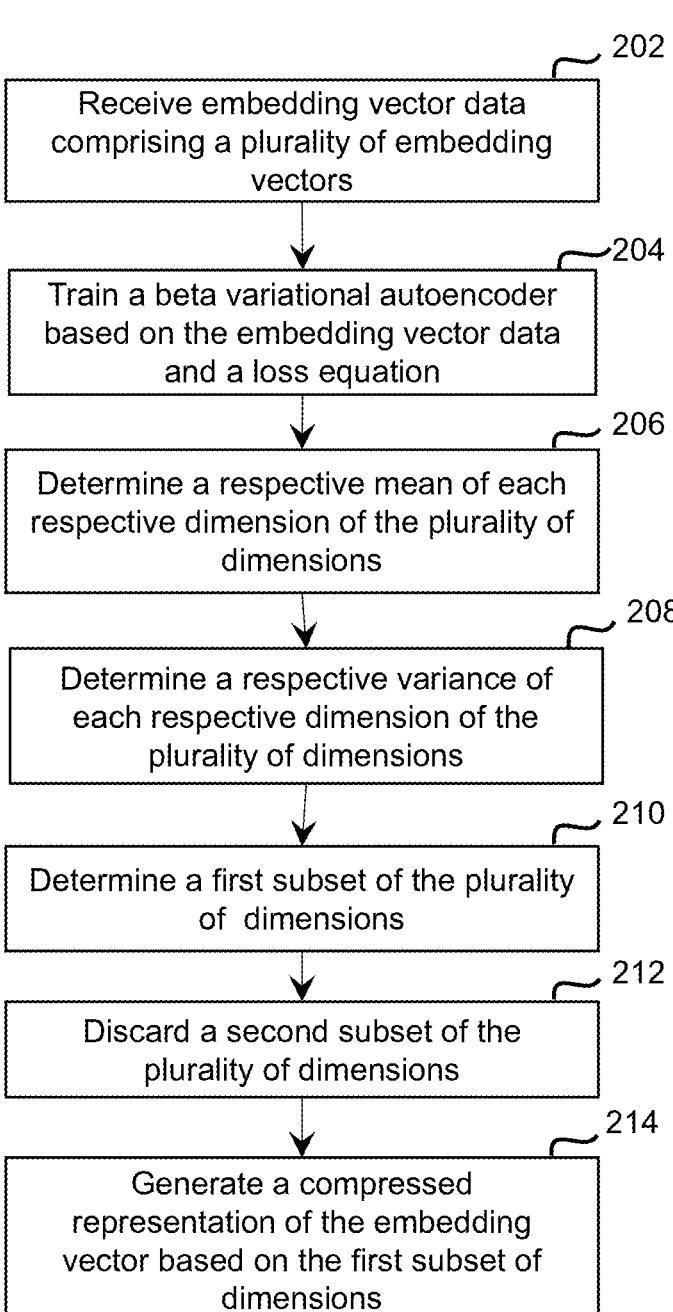

202

Receive embedding vector data comprising a plurality of embedding vectors

204

Train a beta variational autoencoder based on the embedding vector data and a loss equation

206

Determine a respective mean of each respective dimension of the plurality of dimensions

208

Determine a respective variance of each respective dimension of the plurality of dimensions

210

Determine a first subset of the plurality of dimensions

212

Discard a second subset of the plurality of dimensions

214

Generate a compressed representation of the embedding vector based on the first subset of dimensions

FIG. 2

Beta-variational Autoencoder ($\beta$-VAE)

Autoencoder (AE)

| Language | En | De | It | Es | Fa |
|---|---|---|---|---|---|
| FastText (Baseline) | 0.7288 | 0.7350 | 0.7369 | 0.7494 | 0.6784 |
| AE(350) | 0.6977 (350) | 0.7220(350) | 0.7260(350) | 0.7491(350) | 0.6677(350) |
| β-VAE | 0.7082(109) | 0.7132(123) | 0.7365(110) | 0.7448(110) | 0.6926(103) |

Similarity [0,1], higher = more similar

FIG. 6A

METHOD, SYSTEM, AND COMPUTER PROGRAM PRODUCT FOR EMBEDDING COMPRESSION AND REGULARIZATION

CROSS-REFERENCE TO RELATED APPLICATIONS

This application is a continuation application of U.S. patent application Ser. No. 18/027,028, filed Oct. 21, 2022, which is the U.S. national phase of International Application No. PCT/US2022/047409 filed Oct. 21, 2022, and claims priority to U.S. Provisional Patent Application No. 63/270,321, filed on Oct. 21, 2021, the disclosures of each of which are hereby incorporated by reference herein in their entireties.

BACKGROUND

1. Technical Field

This disclosure relates generally to embedding compression and regularization and, in some non-limiting embodiments or aspects, systems, methods, and computer program products for embedding compression and regularization using an autoencoder.

2. Technical Considerations

Autoencoder architecture (e.g., encoder and/or decoder) is used frequently to transfer word embeddings into a latent space. A compressed representation of embedding vector data may be desirable for certain tasks, such as translating between languages, comparing merchant embeddings from different time periods or different areas, and/or the like.

However, using certain techniques, the latent space usually has higher dimensionality than the input embeddings, and little is known about how individual dimensions of the latent space control the semantics encoded in the embeddings. In other techniques, the latent space has less dimensions than the original embedding, but interpretability of the dimensions is difficult, as is determining which dimensions are useful. In either case, the resulting latent space can be more like a chaos space. Therefore, there is a need for techniques for embedding compression and regularization that compresses the latent space and concentrates the semantics onto fewer latent dimensions.

SUMMARY

Accordingly, provided are improved systems, methods, and computer program products for embedding compression and regularization.

Clause 1: A computer-implemented method for generating a compressed representation of embedding vector data, comprising: receiving, with at least one processor, the embedding vector data comprising a plurality of embedding vectors; training, with at least one processor, a beta-variational autoencoder based on the embedding vector data and a loss equation, the beta-variational autoencoder comprising an encoder network, a latent layer, and a decoder network, the loss equation comprising a first term associated with reconstruction of an input by the beta-variational autoencoder, a second term associated with regularization of a latent space of the latent layer, and a hyperparameter weight associated with a ratio of the first term and the second term, wherein the latent space has a plurality of dimensions; determining, with at least one processor, a respective mean of each respective dimension of the plurality of dimensions; determining, with at least one processor, a respective variance of each respective dimension of the plurality of dimensions; determining, with at least one processor, a first subset of the plurality of dimensions based on the respective mean and the respective variance for each respective dimension of the plurality of dimensions; discarding, with at least one processor, a second subset of the plurality of dimensions based on the respective mean and the respective variance of each respective dimension of the plurality of dimensions; and generating, with at least one processor, the compressed representation of the embedding vector data based on the first subset of dimensions.

Clause 2: The computer-implemented method of clause 1, wherein determining the respective mean of each respective dimension of the plurality of dimensions comprises: determining a respective entropy of the respective mean of each respective dimension of the plurality of dimensions; and wherein training the beta-variational autoencoder comprises: iteratively adjusting the hyperparameter weight and repeating the training, the determining of the respective entropy of the respective mean, the determining of the respective variance, the determining of the first subset, the discarding of the second subset, and the generating of the compressed representation.

Clause 3: The computer-implemented method of clause 1 or clause 2, wherein determining the respective mean of each respective dimension of the plurality of dimensions comprises: determining a respective entropy of the respective mean of each respective dimension of the plurality of dimensions; and wherein the method further comprises: determining whether each respective dimension of the plurality of dimensions comprises a useful dimension or a deprecated dimension based on the respective mean and the respective variance for the respective dimension; wherein the respective entropy of the respective mean for each useful dimension is higher than a first threshold and the respective variance of each useful dimension is lower than a second threshold, and wherein the respective entropy of the respective mean for each deprecated dimension is lower than the first threshold and the respective variance of each deprecated dimension is higher than the second threshold.

Clause 4: The computer-implemented method of any of clauses 1-3, wherein the first subset of the plurality of dimensions comprises each useful dimension, and wherein the second subset of the plurality of dimensions comprises each deprecated dimension.

Clause 5: The computer-implemented method of any of clauses 1-4, wherein determining the respective mean of each respective dimension of the plurality of dimensions comprises: determining, with at least one processor, a respective entropy of the respective mean of each respective dimension of the plurality of dimensions; and wherein determining the first subset of the plurality of dimensions comprises: determining the first subset of the plurality of dimensions based on the respective entropy of the respective mean and the respective variance for each respective dimension of the plurality of dimensions.

Clause 6: The computer-implemented method of any of clauses 1-5, wherein discarding the second subset of the plurality of dimensions comprises: discarding the second subset of the plurality of dimensions based on the respective entropy of the respective mean and the respective variance of each respective dimension of the plurality of dimensions.

Clause 7: The computer-implemented method of any of clauses 1-6, wherein the loss equation is:

$$\mathcal{L} = \sum_{i=1}^{n}(x_i - \hat{x}_i)^2 + \beta\sum_{i=1}^{m}D_{KL}\big(\mathcal{N}(\mu_i, \sigma_i^2)\|\mathcal{N}(0, 1)\big)$$

wherein the first term associated with reconstruction of an input by the beta variational autoencoder is:

$$\sum_{i=1}^{n}(x_i - \hat{x}_i)^2;$$

wherein the second term associated with regularization of the latent space of the latent layer is:

$$\sum_{i=1}^{m}D_{KL}\big(\mathcal{N}(\mu_i, \sigma_i^2)\|\mathcal{N}(0, 1)\big);$$

and
wherein the hyperparameter weight associated with the ratio of the first term and the second term is $\beta$.

Clause 8: A system for generating a compressed representation of embedding vector data comprising at least one processor programmed or configured to: receive the embedding vector data comprising a plurality of embedding vectors; train a beta-variational autoencoder based on the embedding vector data and a loss equation, the beta-variational autoencoder comprising an encoder network, a latent layer, and a decoder network, the loss equation comprising a first term associated with reconstruction of an input by the beta-variational autoencoder, a second term associated with regularization of a latent space of the latent layer, and a hyperparameter weight associated with a ratio of the first term and the second term, wherein the latent space has a plurality of dimensions; determine a respective mean of each respective dimension of the plurality of dimensions; determine a respective variance of each respective dimension of the plurality of dimensions; determine a first subset of the plurality of dimensions based on the respective mean and the respective variance for each respective dimension of the plurality of dimensions; discard a second subset of the plurality of dimensions based on the respective mean and the respective variance of each respective dimension of the plurality of dimensions; and generate the compressed representation of the embedding vector data based on the first subset of dimensions.

Clause 9: The system of clause 8, wherein, when determining the respective mean of each respective dimension of the plurality of dimensions, the at least one processor is programmed or configured to: determine a respective entropy of the respective mean of each respective dimension of the plurality of dimensions; and wherein, when training the beta-variational autoencoder, the at least one processor is programmed or configured to: iteratively adjust the hyperparameter weight and repeat the training, the determining of the respective entropy of the respective mean, the determining of the respective variance, the determining of the first subset, the discarding of the second subset, and the generating of the compressed representation.

Clause 10: The system of clause 8 or clause 9, wherein, when determining the respective mean of each respective dimension of the plurality of dimensions, the at least one processor is programmed or configured to: determine a respective entropy of the respective mean of each respective dimension of the plurality of dimensions; and wherein the at least one processor is further programmed or configured to: determine whether each respective dimension of the plurality of dimensions comprises a useful dimension or a deprecated dimension based on the respective mean and the respective variance for the respective dimension; wherein the respective entropy of the respective mean for each useful dimension is higher than a first threshold and the respective variance of each useful dimension is lower than a second threshold, and wherein the respective entropy of the respective mean for each deprecated dimension is lower than the first threshold and the respective variance of each deprecated dimension is higher than the second threshold.

Clause 11: The system of any of clauses 8-10, wherein the first subset of the plurality of dimensions comprises each useful dimension, and wherein the second subset of the plurality of dimensions comprises each deprecated dimension.

Clause 12: The system of any of clauses 8-11, wherein, when determining the respective mean of each respective dimension of the plurality of dimensions, the at least one processor is programmed or configured to: determine a respective entropy of the respective mean of each respective dimension of the plurality of dimensions; and wherein, when determining the first subset of the plurality of dimensions, the at least one processor is programmed or configured to: determine the first subset of the plurality of dimensions based on the respective entropy of the respective mean and the respective variance for each respective dimension of the plurality of dimensions.

Clause 13: The system of any of clauses 8-12, wherein, when discarding the second subset of the plurality of dimensions, the at least one processor is programmed or configured to: discard the second subset of the plurality of dimensions based on the respective entropy of the respective mean and the respective variance of each respective dimension of the plurality of dimensions.

Clause 14: The system of any of clauses 8-13, wherein the loss equation is:

$$\mathcal{L} = \sum_{i=1}^{n}(x_i - \hat{x}_i)^2 + \beta\sum_{i=1}^{m}D_{KL}\big(\mathcal{N}(\mu_i, \sigma_i^2)\|\mathcal{N}(0, 1)\big);$$

wherein the first term associated with reconstruction of an input by the beta-variational autoencoder is:

$$\sum_{i=1}^{n}(x_i - \hat{x}_i)^2;$$

wherein the second term associated with regularization of the latent space of the latent layer is:

$$\sum_{i=1}^{m}D_{KL}\big(\mathcal{N}(\mu_i, \sigma_i^2)\|\mathcal{N}(0, 1)\big);$$

and
wherein the hyperparameter weight associated with the ratio of the first term and the second term is $\beta$.

Clause 15: A computer program product for generating a compressed representation of embedding vector data, the computer program product comprising at least one non-transitory computer readable medium including one or more instructions that, when executed by at least one processor, cause the at least one processor to: receive the embedding vector data comprising a plurality of embedding vectors; train a beta-variational autoencoder based on the embedding vector data and a loss equation, the beta-variational autoencoder comprising an encoder network, a latent layer, and a decoder network, the loss equation comprising a first term associated with reconstruction of an input by the beta-variational autoencoder, a second term associated with regularization of a latent space of the latent layer, and a hyperparameter weight associated with a ratio of the first term and the second term, wherein the latent space has a plurality of dimensions; determine a respective mean of each respective dimension of the plurality of dimensions; determine a respective variance of each respective dimension of the plurality of dimensions; determine a first subset of the plurality of dimensions based on the respective mean and the respective variance for each respective dimension of the plurality of dimensions; discard a second subset of the plurality of dimensions based on the respective mean and the respective variance of each respective dimension of the plurality of dimensions; and generate the compressed representation of the embedding vector data based on the first subset of dimensions.

Clause 16: The computer program product of clause 15, wherein, when determining the respective mean of each respective dimension of the plurality of dimensions, the one or more instructions cause the at least one processor to: determine a respective entropy of the respective mean of each respective dimension of the plurality of dimensions; and wherein, when training the beta-variational autoencoder the one or more instructions further cause the at least one processor to: iteratively adjust the hyperparameter weight and repeat the training, the determining of the respective entropy of the respective mean, the determining of the respective variance, the determining of the first subset, the discarding of the second subset, and the generating of the compressed representation.

Clause 17: The computer program product of clause 15 or clause 16, wherein, when determining the respective mean of each respective dimension of the plurality of dimensions, the one or more instructions cause the at least one processor to: determine a respective entropy of the respective mean of each respective dimension of the plurality of dimensions; and wherein the one or more instructions further cause the at least one processor to: determine whether each respective dimension of the plurality of dimensions comprises a useful dimension or a deprecated dimension based on the respective mean and the respective variance for the respective dimension; wherein the respective entropy of the respective mean for each useful dimension is higher than a first threshold and the respective variance of each useful dimension is lower than a second threshold, and wherein the respective entropy of the respective mean for each deprecated dimension is lower than the first threshold and the respective variance of each deprecated dimension is higher than the second threshold.

Clause 18: The computer program product of any of clauses 15-17, wherein the first subset of the plurality of dimensions comprises each useful dimension, and wherein the second subset of the plurality of dimensions comprises each deprecated dimension.

Clause 19: The computer program product of any of clauses 15-18, wherein, when determining the respective mean of each respective dimension of the plurality of dimensions, the one or more instructions cause the at least one processor to: determine a respective entropy of the respective mean of each respective dimension of the plurality of dimensions; and wherein, when determining the first subset of the plurality of dimensions, the one or more instructions cause the at least one processor to: determine the first subset of the plurality of dimensions based on the respective entropy of the respective mean and the respective variance for each respective dimension of the plurality of dimensions.

Clause 20: The computer program product of any of clauses 15-19, wherein, when discarding the second subset of the plurality of dimensions, the one or more instructions cause the at least one processor to: discard the second subset of the plurality of dimensions based on the respective entropy of the respective mean and the respective variance of each respective dimension of the plurality of dimensions, wherein the loss equation is:

$$\mathcal{L} = \sum_{i=1}^{n}(x_i - \hat{x}_i)^2 + \beta\sum_{i=1}^{m}D_{KL}\big(\mathcal{N}(\mu_i, \sigma_i^2)\|\mathcal{N}(0, 1)\big);$$

wherein the first term associated with reconstruction of an input by the beta-variational autoencoder is:

$$\sum_{i=1}^{n}(x_i - \hat{x}_i)^2;$$

wherein the second term associated with regularization of the latent space of the latent layer is:

$$\sum_{i=1}^{m}D_{KL}\big(\mathcal{N}(\mu_i, \sigma_i^2)\|\mathcal{N}(0, 1)\big);$$

and
wherein the hyperparameter weight associated with the ratio of the first term and the second term is $\beta$.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details are explained in greater detail below with reference to the non-limiting, exemplary embodiments or aspects that are illustrated in the accompanying figures, in which:

FIG. 2 is a flow diagram for a method of embedding compression and regularization, according to non-limiting embodiments or aspects;

FIGS. 6A and 6B are diagrams of quantitative embedding results of machine learning model architectures, according to non-limiting embodiments or aspects.

DETAILED DESCRIPTION

Figure 1:
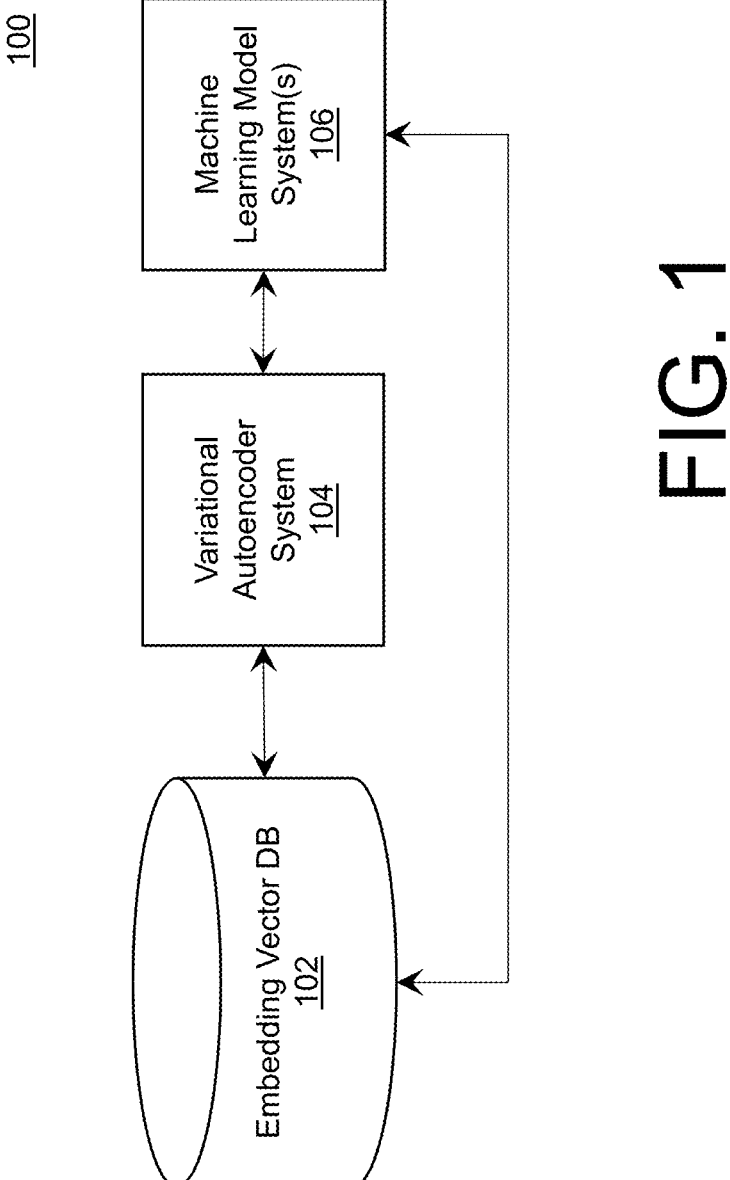
FIG. 1 is a diagram of a system for embedding compression and regularization, according to non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments or aspects as they are oriented in the drawing figures. However, it is to be understood that the embodiments or aspects may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

This disclosure provides a new technique for compressing and regularizing embedding vectors. For example, non-limiting embodiments or aspects of this disclosure describe receiving embedding vector data comprising a plurality of embedding vectors. A beta-variational autoencoder is trained based on the embedding vector data and a loss equation. In some non-limiting embodiments or aspects, the beta-variational autoencoder includes an encoder network, a latent layer, and a decoder network. In some non-limiting embodiments or aspects, the loss equation includes a first term associated with reconstruction of an input by the beta-variational autoencoder, a second term associated with regularization of a latent space of the latent layer, and a hyperparameter weight associated with a ratio of the first term and the second term. In some non-limiting embodiments or aspects, the latent space includes a plurality of dimensions. The disclosure describes determining a respective entropy of a respective mean and a respective variance of each respective dimension of a plurality of dimensions. A first subset of the plurality of dimensions may be determined based on the respective entropy of the respective mean and the respective variance for each respective dimension of the plurality of dimensions. A second subset of the plurality of dimensions may be discarded based on the respective entropy of the respective mean and the respective variance for each respective dimension of the plurality of dimensions. The disclosure provides for generating a compressed representation of the embedding vector data based on the first subset of dimensions. As such, the subject matter of the disclosure improves computer technology by compressing embeddings while achieving similar or better accuracy (e.g., as shown by similarity scores, semantic probing, and performance of downstream tasks) to techniques using a larger number of dimensions. This compression also conserves computing resources in terms of the memory needed to store the compressed embeddings and the number of input dimensions needed for downstream models.

FIG. 1 depicts a system 100 for embedding compression and regularization, according to a non-limiting embodiment or aspect. The system 100 includes embedding vector database 102, variational autoencoder system 104, and machine learning model system(s) 106.

Embedding vector database 102 may include one or more devices capable of receiving information from and/or communicating information to variational autoencoder system 104 and/or machine learning model system(s) 106. For example, embedding vector database 102 may include a computing device, such as a computer, a server, a group of servers, and/or other like devices. In some non-limiting embodiments or aspects, embedding vector database 102 may be in communication with a data storage device, which may be local or remote to embedding vector database 102. In some non-limiting embodiments or aspects, embedding vector database 102 may be capable of receiving information from, storing information in, communicating information to, or searching information stored in the data storage device.

Variational autoencoder system 104 may include one or more devices capable of receiving information from and/or communicating information to embedding vector database 102, and/or machine learning model system(s) 106. For example, variational autoencoder system 104 may include a computing device, such as a computer, a server, a group of servers, and/or other like devices. In some non-limiting embodiments or aspects, variational autoencoder system 104 may be associated with a financial institution, a transaction service provider, and/or an issuer, as described herein. For example, variational autoencoder system 104 may be operated by a financial institution, a transaction service provider, and/or an issuer.

Machine learning model system(s) 106 may include one or more devices capable of receiving information from and/or communicating information to embedding vector database 102 and/or variational autoencoder system 104. For example, machine learning model system(s) 106 may include a computing device, such as a computer, a server, a group of servers, and/or other like devices. In some non-limiting embodiments or aspects, machine learning model system(s) 106 may be associated with a financial institution, a transaction service provider, and/or an issuer, as described herein. For example, machine learning model system(s) 106 may be operated by a financial institution, a transaction service provider, and/or an issuer.

In some non-limiting embodiments or aspects, variational autoencoder system 104 may receive (e.g., from embedding vector database 102) embedding vector data, as described herein. For example, the embedding vector data may include a plurality of embedding vectors, as described herein. In some non-limiting embodiments or aspects, variational autoencoder system 104 may train a beta-variational autoencoder, as described herein. For example, training the beta-variational autoencoder may be based on the embedding vector data and a loss equation, as described herein. The beta-variational autoencoder may include an encoder network, a latent layer, and/or a decoder network, as described herein. The loss equation may include a first term associated with reconstruction of an input by the beta-variational autoencoder, a second term associated with regularization of a latent space of the latent layer, and/or a hyperparameter weight associated with a ratio of the first term and the second term, as described herein. The latent space may have a plurality of dimensions, as described herein. In some non-limiting embodiments or aspects, variational autoencoder system 104 may determine a respective entropy of a respective mean of each respective dimension of the plurality of dimensions, as described herein. Additionally or alternatively, variational autoencoder system 104 may determine a respective variance of each respective dimension of the plurality of dimensions, as described herein. In some non-limiting embodiments or aspects, variational autoencoder system 104 may determine a first subset of the plurality of dimensions, as described herein. For example, the first subset of the plurality of dimensions may be based on the respective entropy of the respective mean and the respective variance for each respective dimension of the plurality of dimensions, as described herein. In some non-limiting embodiments or aspects, variational autoencoder system 104 may discard a second subset of the plurality of dimensions, as described herein. For example, variational autoencoder system 104 may discard a second subset of the plurality of dimensions based on the respective entropy of the respective mean and the respective variance of each respective dimension of the plurality of dimensions, as described herein. In some non-limiting embodiments or aspects, variational autoencoder system 104 may generate a compressed representation of the embedding vector data. For example, variational autoencoder system 104 may generate a compressed representation of the embedding vector data based on the first subset of dimensions, as described herein.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of system 100 may perform one or more functions described as being performed by another set of devices of system 100.

Referring now to FIG. 2, shown is a process 200 for embedding compression and regularization. The steps shown in FIG. 2 are for example purposes only. It will be appreciated that additional, fewer, different, and/or a different order of steps may be used in non-limiting embodiments or aspects. In some non-limiting embodiments or aspects, one or more of the steps of process 200 may be performed (e.g., completely, partially, etc.) by variational autoencoder system 104 (e.g., one or more devices of variational autoencoder system 104). In some non-limiting embodiments or aspects, one or more of the steps of process 200 may be performed (e.g., completely, partially, etc.) by another device or group of devices separate from or including variational autoencoder system 104, such as embedding vector database 102, and/or machine learning model system(s) 106 (e.g., one or more devices of machine learning model system(s) 106).

As shown in FIG. 2, at step 202, process 200 may include receiving embedding vector data comprising a plurality of embedding vectors. For example, variational autoencoder system 104 may receive embedding vector data from embedding vector database 102. In some non-limiting embodiments or aspects, the embedding vector data may include a plurality of embedding vectors.

As shown in FIG. 2, at step 204, process 200 may include training a beta-variational autoencoder. For example, variational autoencoder system 104 may train a beta-variational autoencoder based on the embedding vector data and/or a loss equation. In some non-limiting embodiments or aspects, the beta-variational autoencoder may include an encoder network, a latent layer, and/or a decoder network. In some non-limiting embodiments or aspects, the loss equation may include a first term associated with reconstruction of an input by the beta-variational autoencoder, a second term with regularization of a latent space of the latent layer, and/or a hyperparameter weight associated with a ratio of the first term and the second term. In some non-limiting embodiments or aspects, the latent space may include a plurality of dimensions.

As shown in FIG. 2, at step 206, process 200 may include determining a respective mean for each respective dimension of the plurality of dimensions. For example, variational autoencoder system 104 may determine a respective mean for each respective dimension of the plurality of dimensions. In some non-limiting embodiments or aspects, variational autoencoder system 104 may determine a respective entropy of a respective mean for each respective dimension of the plurality of dimensions.

As shown in FIG. 2, at step 208, process 200 may include determining a respective variance of each respective dimension of the plurality of dimensions. For example, variational autoencoder system 104 may determine a respective variance of each respective dimension of the plurality of dimensions.

As shown in FIG. 2, at step 210, process 200 may include determining a first subset of the plurality of dimensions. For example, variational autoencoder system 104 may determine a first subset of the plurality of dimensions based on the respective mean and the respective variance for each respective dimension of the plurality of dimensions. In some non-limiting embodiments or aspects, variational autoencoder system 104 may determine the first subset of the plurality of dimensions based on the respective entropy of the respective mean and the respective variance for each respective dimension of the plurality of dimensions As shown in FIG. 2, at step 212, process 200 may include discarding a second subset of the plurality of dimensions. For example, variational autoencoder system 104 may discard a second subset of the plurality of dimensions based on the respective entropy of the respective mean and the respective variance of each respective dimension of the plurality of dimensions.

As shown in FIG. 2, at step 214, process 200 may include generating a compressed representation of the embedding vector data. For example, variational autoencoder system 104 may generate a compressed representation of the embedding vector data based on the first subset of dimensions. In some non-limiting embodiments or aspects, the compressed representation of the embedding vector data may include one or more embedding vectors with a reduced number of dimensions compared to a number of dimensions of the plurality of embedding vectors associated with the embedding vector data.

Additionally or alternatively, process 200 may include iteratively adjusting the hyperparameter weight and repeating the training, the determining of the respective entropy of the respective mean, the determining of the respective variance, the determining of the first subset, the discarding of the second subset, and/or the generating of the compressed representation. For example, variational autoencoder system 104 may iteratively adjust the hyperparameter weight and repeat the training, the determining of the respective entropy of the respective mean, the determining of the respective variance, the determining of the first subset, the discarding of the second subset, and/or the generating of the compressed representation.

Additionally or alternatively, process 200 may include determining whether each respective dimension of the plurality of dimensions includes a useful dimension or a deprecated dimension. For example, variational autoencoder system 104 may determine whether each respective dimension of the plurality of dimensions is a useful dimension or a deprecated dimension based on the respective entropy of the respective mean and the respective variance for the respective dimension. In some non-limiting embodiments or aspects, the respective entropy of the respective mean for each useful dimension may be higher than a first threshold and the respective variance of each useful dimension may be lower than a second threshold. In some non-limiting embodiments or aspects, the respective entropy of the respective mean for each deprecated dimension may be lower than a first threshold and the respective variance of each deprecated dimension may be higher than a second threshold. In some non-limiting embodiments or aspects, the first subset of the plurality of dimensions may include each useful dimension. In some non-limiting embodiments or aspects, the second subset of the plurality of dimensions may include each deprecated dimension.

Figure 3:
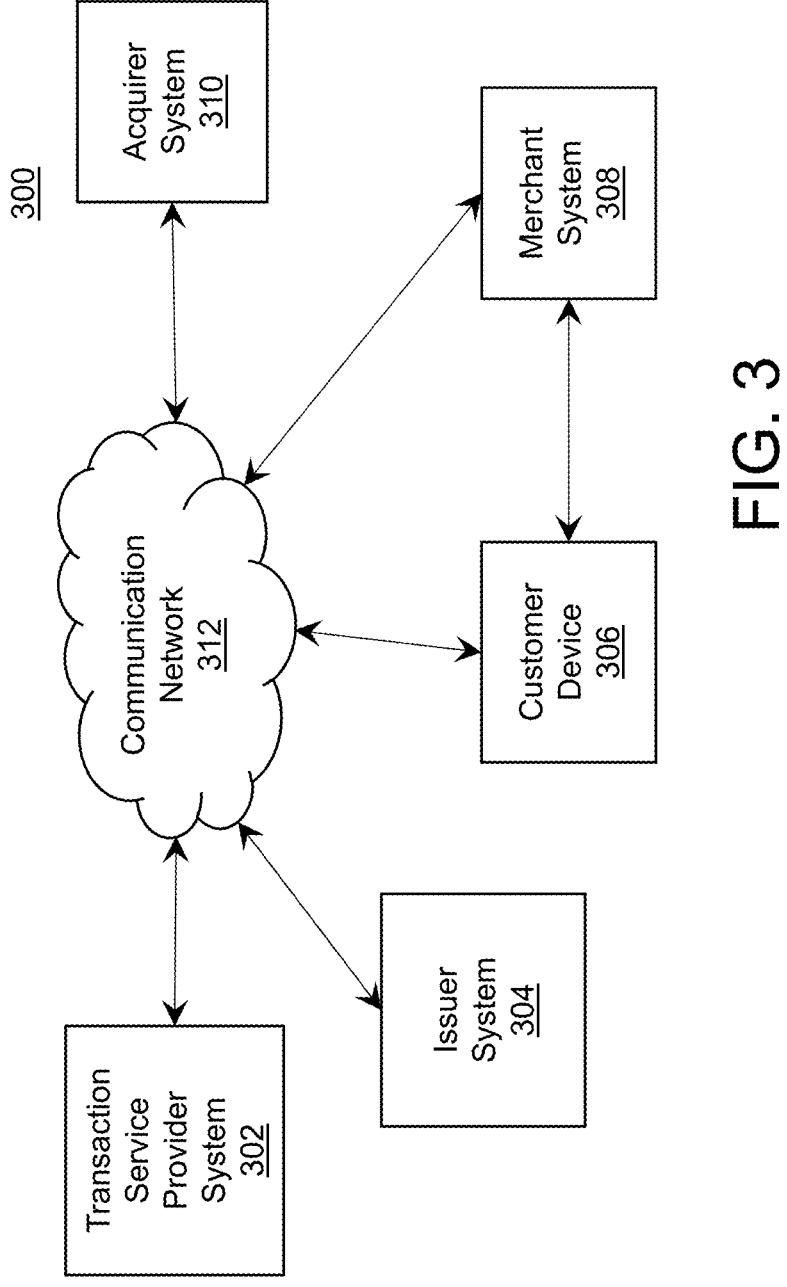
FIG. 3 is a diagram of an example environment in which methods, systems, and/or computer program products, described herein, may be implemented, according to non-limiting embodiments or aspects.

Referring now to FIG. 3, shown is a diagram of non-limiting embodiments or aspects of an environment in which methods, systems, and/or computer program products, described herein, may be implemented according to the principles of the presently disclosed subject matter. As shown in FIG. 3, environment 300 includes transaction service provider system 302, issuer system 304, customer device 306, merchant system 308, acquirer system 310, and communication network 312. In some non-limiting embodiments or aspects, each of embedding vector database 102, variational autoencoder system 104, and machine learning model system(s) 106 may be implemented by (e.g., part of) transaction service provider system 302. In some non-limiting embodiments or aspects, at least one of embedding vector database 102, variational autoencoder system 104, and machine learning model system(s) 106 may be implemented by (e.g., part of) another system, another device, another group of systems, or another group of devices, separate from or including transaction service provider system 302, such as issuer system 304, merchant system 308, acquirer system 310, and/or the like.

Transaction service provider system 302 may include one or more devices capable of receiving information from and/or communicating information to issuer system 304, customer device 306, merchant system 308, and/or acquirer system 310 via communication network 312. For example, transaction service provider system 302 may include a computing device, such as a server (e.g., a transaction processing server), a group of servers, and/or other like devices. In some non-limiting embodiments or aspects, transaction service provider system 302 may be associated with a transaction service provider, as described herein. In some non-limiting embodiments or aspects, transaction service provider system 302 may be in communication with a data storage device, which may be local or remote to transaction service provider system 302. In some non-limiting embodiments or aspects, transaction service provider system 302 may be capable of receiving information from, storing information in, communicating information to, or searching information stored in the data storage device.

Issuer system 304 may include one or more devices capable of receiving information and/or communicating information to transaction service provider system 302, customer device 306, merchant system 308, and/or acquirer system 310 via communication network 312. For example, issuer system 304 may include a computing device, such as a server, a group of servers, and/or other like devices. In some non-limiting embodiments or aspects, issuer system 304 may be associated with an issuer institution, as described herein. For example, issuer system 304 may be associated with an issuer institution that issued a credit account, debit account, credit card, debit card, and/or the like to a user associated with customer device 306.

Customer device 306 may include one or more devices capable of receiving information from and/or communicating information to transaction service provider system 302, issuer system 304, merchant system 308, and/or acquirer system 310 via communication network 312. Additionally or alternatively, each customer device 306 may include a device capable of receiving information from and/or communicating information to other customer devices 306 via communication network 312, another network (e.g., an ad hoc network, a local network, a private network, a virtual private network, and/or the like), and/or any other suitable communication technique. For example, customer device 306 may include a client device and/or the like. In some non-limiting embodiments or aspects, customer device 306 may or may not be capable of receiving information (e.g., from merchant system 308 or from another customer device 306) via a short-range wireless communication connection (e.g., an NFC communication connection, an RFID communication connection, a Bluetooth® communication connection, a Zigbee® communication connection, and/or the like), and/or communicating information (e.g., to merchant system 308) via a short-range wireless communication connection.

Merchant system 308 may include one or more devices capable of receiving information from and/or communicating information to transaction service provider system 302, issuer system 304, customer device 306, and/or acquirer system 310 via communication network 312. Merchant system 308 may also include a device capable of receiving information from customer device 306 via communication network 312, a communication connection (e.g., an NFC communication connection, an RFID communication connection, a Bluetooth® communication connection, a Zigbee® communication connection, and/or the like) with customer device 306, and/or the like, and/or communicating information to customer device 306 via communication network 312, the communication connection, and/or the like. In some non-limiting embodiments or aspects, merchant system 308 may include a computing device, such as a server, a group of servers, a client device, a group of client devices, and/or other like devices. In some non-limiting embodiments or aspects, merchant system 308 may be associated with a merchant, as described herein. In some non-limiting embodiments or aspects, merchant system 308 may include one or more client devices. For example, merchant system 308 may include a client device that allows a merchant to communicate information to transaction service provider system 302. In some non-limiting embodiments or aspects, merchant system 308 may include one or more devices, such as computers, computer systems, and/or peripheral devices capable of being used by a merchant to conduct a transaction with a user. For example, merchant system 308 may include a POS device and/or a POS system.

Acquirer system 310 may include one or more devices capable of receiving information from and/or communicating information to transaction service provider system 302, issuer system 304, customer device 306, and/or merchant system 308 via communication network 312. For example, acquirer system 310 may include a computing device, a server, a group of servers, and/or the like. In some non-limiting embodiments or aspects, acquirer system 310 may be associated with an acquirer, as described herein.

Communication network 312 may include one or more wired and/or wireless networks. For example, communication network 312 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 306, a POS device of merchant system 308, and/or the like) may initiate the transaction, e.g., by generating an authorization request. Additionally or alternatively, the client device (e.g., customer device 306, at least on device of merchant system 308, and/or the like) may communicate the authorization request. For example, customer device 306 may communicate the authorization request to merchant system 308 and/or a payment gateway (e.g., a payment gateway of transaction service provider system 302, a third-party payment gateway separate from transaction service provider system 302, and/or the like). Additionally or alternatively, merchant system 308 (e.g., a POS device thereof) may communicate the authorization request to acquirer system 310 and/or a payment gateway. In some non-limiting embodiments or aspects, acquirer system 310 and/or a payment gateway may communicate the authorization request to transaction service provider system 302 and/or issuer system 304. Additionally or alternatively, transaction service provider system 302 may communicate the authorization request to issuer system 304. In some non-limiting embodiments or aspects, issuer system 304 may determine an authorization decision (e.g., authorize, decline, and/or the like) based on the authorization request. For example, the authorization request may cause issuer system 304 to determine the authorization decision based thereof. In some non-limiting embodiments or aspects, issuer system 304 may generate an authorization response based on the authorization decision. Additionally or alternatively, issuer system 304 may communicate the authorization response. For example, issuer system 304 may communicate the authorization response to transaction service provider system 302 and/or a payment gateway. Additionally or alternatively, transaction service provider system 302 and/or a payment gateway may communicate the authorization response to acquirer system 310, merchant system 308, and/or customer device 306. Additionally or alternatively, acquirer system 310 may communicate the authorization response to merchant system 308 and/or a payment gateway. Additionally or alternatively, a payment gateway may communicate the authorization response to merchant system 308 and/or customer device 306. Additionally or alternatively, merchant system 308 may communicate the authorization response to customer device 306. In some non-limiting embodiments or aspects, merchant system 308 may receive (e.g., from acquirer system 310 and/or a payment gateway) the authorization response. Additionally or alternatively, merchant system 308 may complete the transaction based on the authorization response (e.g., provide, ship, and/or deliver goods and/or services associated with the transaction; fulfill an order associated with the transaction; any combination thereof; and/or the like).

For the purpose of illustration, processing a transaction may include generating a transaction message (e.g., authorization request and/or the like) based on an account identifier of a customer (e.g., associated with customer device 306 and/or the like) and/or transaction data associated with the transaction. For example, merchant system 308 (e.g., a client device of merchant system 308, a POS device of merchant system 308, and/or the like) may initiate the transaction, e.g., by generating an authorization request (e.g., in response to receiving the account identifier from a portable financial device of the customer and/or the like). Additionally or alternatively, merchant system 308 may communicate the authorization request to acquirer system 310. Additionally or alternatively, acquirer system 310 may communicate the authorization request to transaction service provider system 302. Additionally or alternatively, transaction service provider system 302 may communicate the authorization request to issuer system 304. Issuer system 304 may determine an authorization decision (e.g., authorize, decline, and/or the like) based on the authorization request, and/or issuer system 304 may generate an authorization response based on the authorization decision and/or the authorization request. Additionally or alternatively, issuer system 304 may communicate the authorization response to transaction service provider system 302. Additionally or alternatively, transaction service provider system 302 may communicate the authorization response to acquirer system 310, which may communicate the authorization response to merchant system 308.

For the purpose of illustration, clearing and/or settlement of a transaction may include generating a message (e.g., clearing message, settlement message, and/or the like) based on an account identifier of a customer (e.g., associated with customer device 306 and/or the like) and/or transaction data associated with the transaction. For example, merchant system 308 may generate at least one clearing message (e.g., a plurality of clearing messages, a batch of clearing messages, and/or the like). Additionally or alternatively, merchant system 308 may communicate the clearing message(s) to acquirer system 310. Additionally or alternatively, acquirer system 310 may communicate the clearing message(s) to transaction service provider system 302. Additionally or alternatively, transaction service provider system 302 may communicate the clearing message(s) to issuer system 304. Additionally or alternatively, issuer system 304 may generate at least one settlement message based on the clearing message(s).

Additionally or alternatively, issuer system 304 may communicate the settlement message(s) and/or funds to transaction service provider system 302 (and/or a settlement bank system associated with transaction service provider system 302). Additionally or alternatively, transaction service provider system 302 (and/or the settlement bank system) may communicate the settlement message(s) and/or funds to acquirer system 310, which may communicate the settlement message(s) and/or funds to merchant system 308 (and/or an account associated with merchant system 308).

The number and arrangement of systems, devices, and/or networks shown in FIG. 3 are provided as an example. There may be additional systems, devices, and/or networks; fewer systems, devices, and/or networks; different systems, devices, and/or networks; and/or differently arranged systems, devices, and/or networks than those shown in FIG. 3. Furthermore, two or more systems or devices shown in FIG.

3 may be implemented within a single system or device, or a single system or device shown in FIG. 3 may be implemented as multiple, distributed systems or devices. Additionally or alternatively, a set of systems (e.g., one or more systems) or a set of devices (e.g., one or more devices) of environment 300 may perform one or more functions described as being performed by another set of systems or another set of devices of environment 300.

Figure 4:
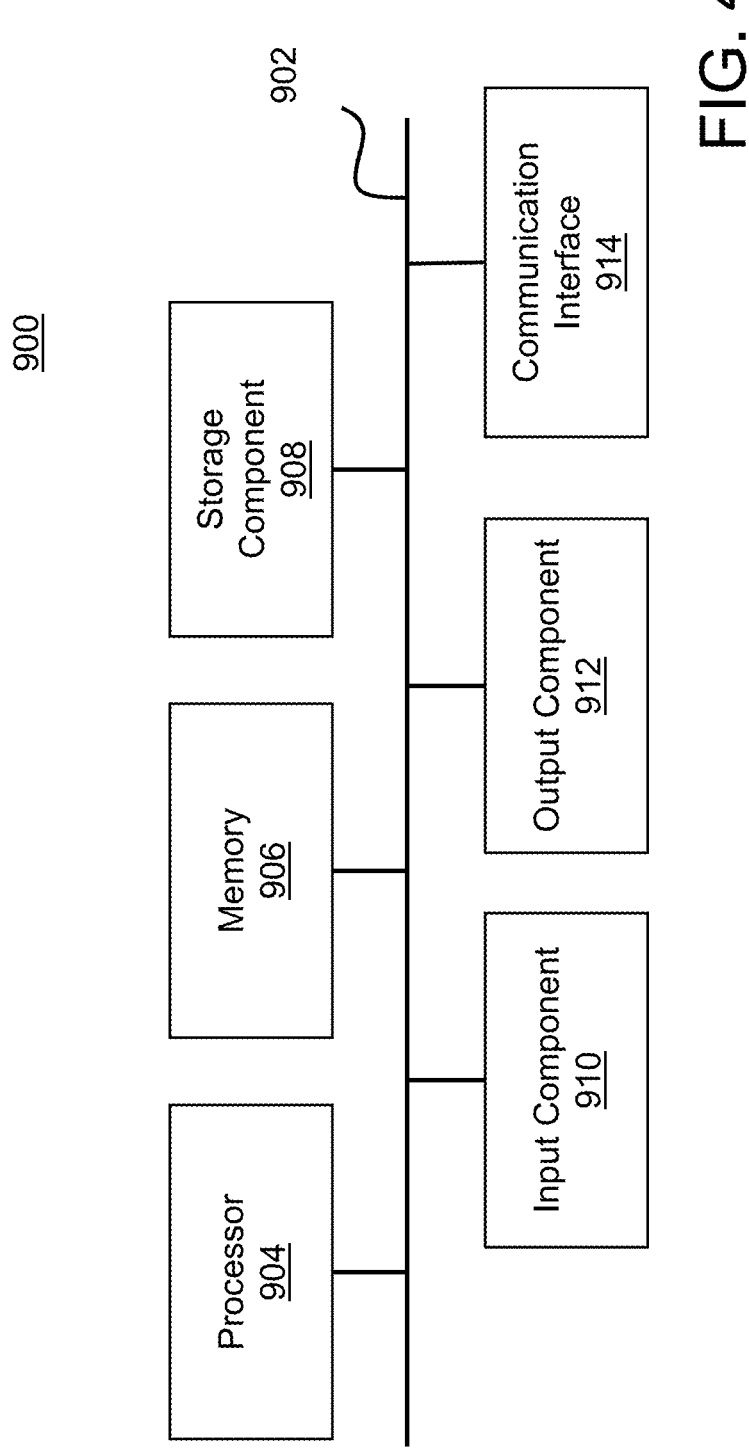
FIG. 4 illustrates example components of a device used in connection with non-limiting embodiments or aspects.

Referring now to FIG. 4, shown is a diagram of example components of a device 900 according to non-limiting embodiments or aspects. Device 900 may correspond to embedding vector database 102, variational autoencoder system 104, and/or machine learning system(s) 106 in FIG. 1 and/or to transaction service provider system 302, issuer system 304, customer device 306, merchant system 308, and/or acquirer system 310 in FIG. 3, as an example. In some non-limiting embodiments or aspects, such systems or devices may include at least one device 900 and/or at least one component of device 900. The number and arrangement of components shown are provided as an example. In some non-limiting embodiments or aspects, device 900 may include additional components, fewer components, different components, or differently arranged components than those shown in FIG. 1. Additionally, or alternatively, a set of components (e.g., one or more components) of device 900 may perform one or more functions described as being performed by another set of components of device 900.

As shown in FIG. 4, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 4, storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Figure 5:
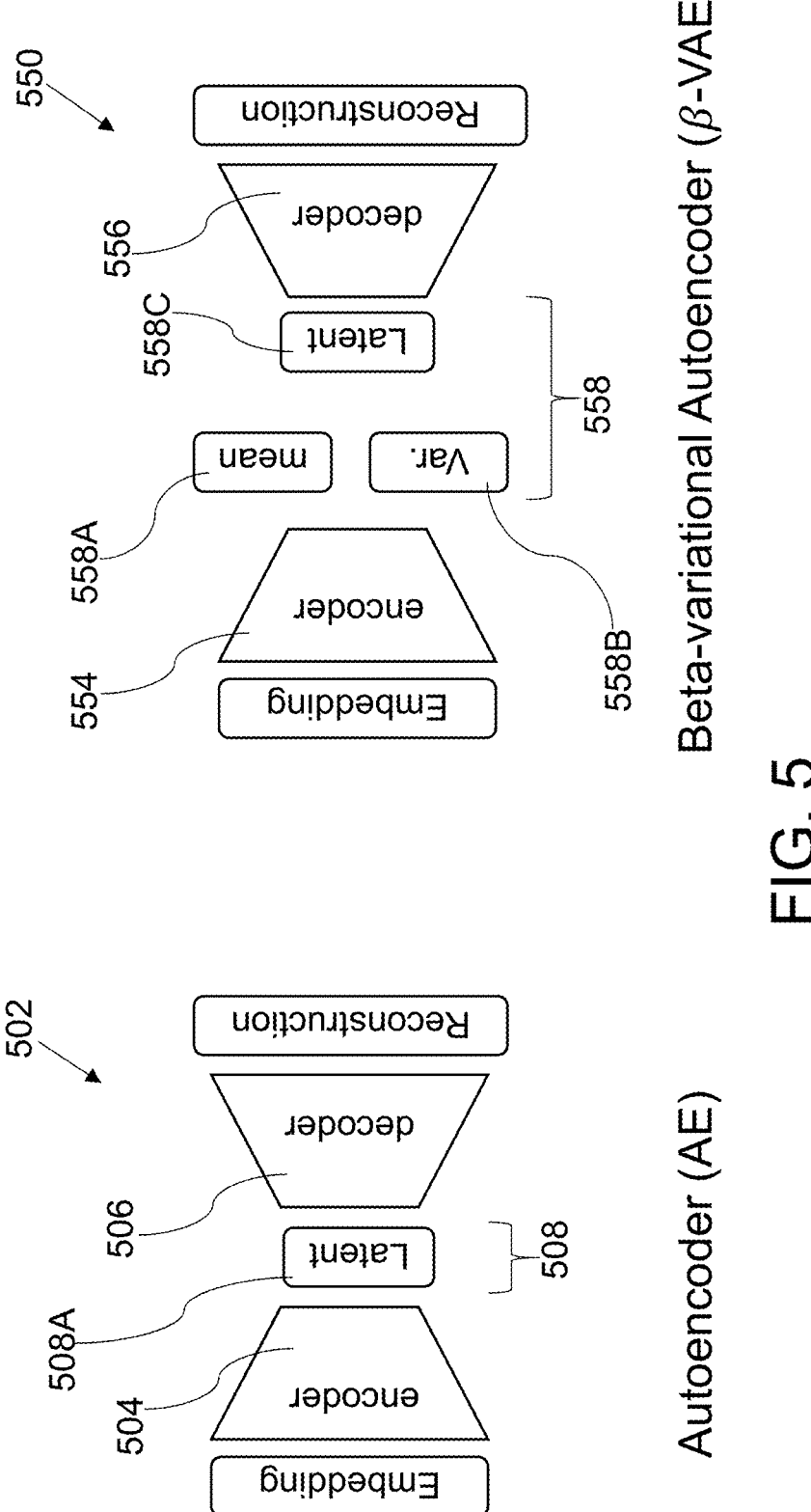
FIG. 5 is a diagram of machine learning model architectures, according to non-limiting embodiments or aspects.

Referring now to FIG. 5, shown is a diagram of machine learning model architecture of an autoencoder 502 and machine learning model architecture of a beta-variational autoencoder 550. In some non-limiting embodiments or aspects, autoencoder 502 may include a neural network (e.g., an unsupervised deep neural network) having two sub-networks, encoder network 504 and decoder network 506. Encoder network 504 may receive each training instance as input and may transfer the input to latent layer 508 (e.g., latent space representation) to become latent vector 508A (e.g., a high dimension latent vector). In some non-limiting embodiments or aspects, latent layer 508 may include a set of scalars (e.g., one or more vectors). Decoder network 506 may take latent vector 508A as input and reconstruct the training instance from latent vector 508A. In some non-limiting embodiments or aspects, encoder network 504 and decoder network 506 may be trained jointly to minimize a difference between an input and a corresponding reconstruction.

In some non-limiting embodiments or aspects, beta-variational autoencoder 550 may include a neural network (e.g., an unsupervised deep neural network) having two sub-networks, encoder network 554 and decoder network 556. As shown in FIG. 5, latent space 558 may include a set of Gaussian distributions, each having a mean 558A and a variance 558B. In some non-limiting embodiments, mean 558A may be parameterized by a mean vector and variance 558B may be parameterized by a variance vector. Encoder network 554 may receive each training instance as input and may transfer the input to latent space 558 to generate latent vector 558C (e.g., a high dimension latent vector based on the Gaussian distributions having mean 558A and variance 558B). In some non-limiting embodiments, decoder network 556 may receive a sample (e.g., a random sample) from each Gaussian distribution to generate latent vector 558C and decoder network 556 may take latent vector 558C as input and reconstruct a training instance (e.g., each training instance from a training dataset) from latent vector 558C.

In some non-limiting embodiments or aspects, variational autoencoder system 104 may carry out a process (e.g., process 200) for embedding compression and regularization using variational autoencoder 550. In some non-limiting embodiments or aspects, variational autoencoder system 104 may train variational autoencoder 550 (e.g., a beta-variational autoencoder) based on embedding vector data, which includes a plurality of embedding vectors, and a loss equation. In some non-limiting embodiments or aspects, the loss equation of variational autoencoder 550 may include a term associated with reconstruction of an input by beta-variational autoencoder, referred to as reconstruction loss (e.g., which may include a reconstruction loss inherited from autoencoder 502) and a term associated with regularization of latent space 558 (e.g., latent space 558 of a latent layer that includes Gaussian distributions with mean 558A and variance 558B, and latent vector 558C), referred to as regularization loss.

In some non-limiting embodiments or aspects, the regularization loss may minimize the Kullback-Leibler divergence ($D_{KL}$) between each Gaussian distribution and a unit Gaussian distribution. A loss equation of beta-variational autoencoder 550 may be:

$$\mathcal{L} = \sum_{i=1}^{n}(x_i - \hat{x}_i)^2 + \beta\sum_{i=1}^{m}D_{KL}\big(\mathcal{N}(\mu_i, \sigma_i^2)\|\mathcal{N}(0, 1)\big), \tag{1}$$

where x and $\hat{x}$ are the input and reconstruction (e.g., the reconstruction of the input as provided by beta-variational autoencoder 550), respectively, with n dimensions. $\mathcal{N}$ is the function for a normal distribution (e.g., Gaussian distribution). The first loss term of equation (1), which may include a difference between x and $\hat{x}$ is minimized by a $L^2$ norm loss, is:

$$\sum_{i=1}^{n}(x_i - \hat{x}_i)^2$$

The first loss term may be referred to as the reconstruction loss. In some non-limiting embodiments or aspects, m is the dimensionality of the latent space (e.g., latent space 558) and the latent representation of x on each latent dimension is a Gaussian parameters by $\mu_i$ and $\sigma_i^2$. The second loss term, which may be referred to as the regularization loss and may be used to constrain the latent space, is:

$$\sum_{i=1}^{m}D_{KL}\big(\mathcal{N}(\mu_i, \sigma_i^2)\|\mathcal{N}(0, 1)\big)$$

$\beta$ may be a weight term (e.g., a hyperparameter weight) that is associated with a ratio of the first term and the second term. $\beta$ may control a reconstruction and regularization ratio, which may be used to balance the first and second loss terms, and may be equal to 1. In some non-limiting embodiments or aspects, decreasing a value of β (e.g., relatively small) may reduce the dimensionality of a latent space, preserve the quality of reconstruction of an input, and/or allow each latent vector to become more semantically salient. In some non-limiting embodiments or aspects, increasing a value of β (e.g., relatively small) may increase the dimensionality of a latent space and/or prevent the loss of information regarding an input.

In some non-limiting embodiments or aspects, β may be a value other than 1. For example, β may be larger than 1 to further regularize the latent space. In some non-limiting embodiments or aspects, values of β may be selected to effectively disentangle the latent space to make each latent dimension encode more orthogonal information than with other values of β, which may further regularize individual latent dimensions, and some latent dimensions may converge to unit Gaussians. As a result, the remaining dimensions may have to encode more information and in a more effective way to keep the overall loss small.

In some non-limiting embodiments or aspects, latent space 558 may have a plurality of dimensions and variational autoencoder system 104 may determine a respective mean, $\mu_i$, (e.g., a mean term of a Gaussian distribution) of each respective dimension of the plurality of dimensions and/or a respective variance, $\sigma_i^2$, (e.g., a variance term of a Gaussian distribution) of each respective dimension of the plurality of dimensions. For example, variational autoencoder system 104 may determine a respective entropy of the respective mean of each respective dimension of the plurality of dimensions.

In some non-limiting embodiments or aspects, variational autoencoder system 104 may determine whether each respective dimension of the plurality of dimensions includes a useful dimension (e.g., to be kept) or a deprecated dimension (e.g., to be discarded) based on the respective mean and the respective variance for the respective dimension. For example, variational autoencoder system 104 may filter the plurality of dimensions using an entropy threshold (e.g., an entropy cutoff that includes a relatively steep negative slope) and a variance threshold (e.g., a variance cutoff that includes a relatively steep positive slope) such that if entropy has a high negative rate of change and variance has a high positive rate of change, dimensions around this condition are useful, and otherwise the dimensions may be discarded.

In some non-limiting embodiments or aspects, variational autoencoder system 104 may encode all n inputs into latent space 558. For each dimension, there may be n Gaussians (e.g., n pairs of mean and variance), one for each input. Variational autoencoder system 104 may calculate the entropy of the n mean values. For a useful dimension, the corresponding entropy is larger as the n inputs are encoded using the full range of values of the dimension. For a deprecated dimension, however, the entropy is small and tends to be 0, and may be restricted by the regularization loss (e.g., as the Kullback-Leibler (KL) loss of beta-variational autoencoder 550 pushes all Gaussians to be unit Gaussians).

In some non-limiting embodiments or aspects, variational autoencoder system 104 may compare a respective entropy of the respective mean to a threshold of entropy for each dimension. Additionally or alternatively, variational autoencoder system 104 may compare the respective variance to a threshold of variance for each dimension. In some non-limiting embodiments or aspects, if the respective entropy of the respective mean satisfies the threshold of entropy, a dimension may be determined by variational autoencoder system 104 to be useful (e.g., a useful dimension). In some non-limiting embodiments or aspects, if the respective entropy of the respective mean does not satisfy the threshold of entropy, a dimension may be determined by variational autoencoder system 104 not to be useful (e.g., a deprecated dimension).

In some non-limiting embodiments or aspects, a respective entropy of the respective mean for each useful dimension may be higher than a first threshold and the respective variance of each useful dimension is lower than a second threshold, and the respective entropy of the respective mean for each deprecated dimension is lower than the first threshold and the respective variance of each deprecated dimension is higher than the second threshold.

In some non-limiting embodiments or aspects, variational autoencoder system 104 may determine a first subset of the plurality of dimensions based on the respective mean and the respective variance for each respective dimension of the plurality of dimensions. For example, variational autoencoder system 104 may determine the first subset of the plurality of dimensions based on a respective entropy of the respective mean and the respective variance for each respective dimension of the plurality of dimensions.

In some non-limiting embodiments or aspects, variational autoencoder system 104 may discard a second subset of the plurality of dimensions based on the respective mean and the respective variance of each respective dimension of the plurality of dimensions. For example, variational autoencoder system 104 may discard a second subset of the plurality of dimensions based on a respective entropy of the respective mean and the respective variance of each respective dimension of the plurality of dimensions. In some non-limiting embodiments or aspects, the number of latent dimensions in the second subset that are discarded by variational autoencoder system 104 may correlate to a value of β.

In some non-limiting embodiments or aspects, variational autoencoder system 104 may generate a compressed representation of the embedding vector data, for example, latent vector 558C, based on the first subset of dimensions.

Figure 6B:
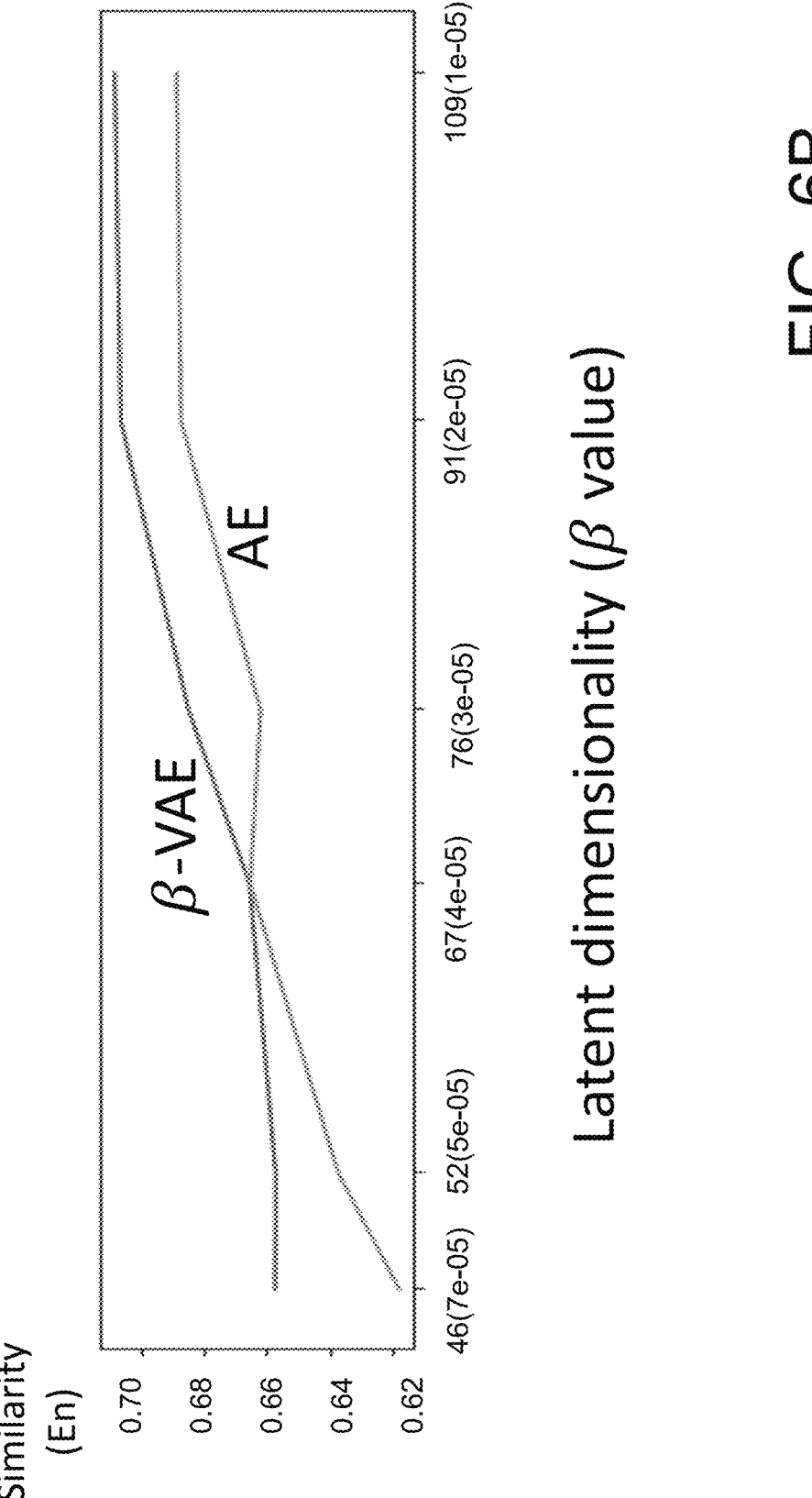

Referring now to FIGS. 6A and 6B, shown are diagrams of quantitative embedding results. FIG. 6A is a table that shows similarity scores for monolingual embeddings for 3 types of machine learning models. The similarity score (e.g., 0 to 1, where 1 indicates equivalence) shown in FIG. 6A provides an indication regarding the quality of a regularized embedding for individual languages. The tables shows the results of monolingual for five languages, English (En), German (De), Italian (It), Spanish (Es), and Persian (Fa). FastText provides raw embeddings (e.g., 300 dimensions) that are used as inputs to an autoencoder (AE) (e.g., autoencoder 502) and a beta-variational autoencoder (β VAE) (e.g., beta-variational autoencoder 550). Both AE and β VAE have been trained with 350 dimensions, and β VAE was compressed to the number of dimensions shown in parentheses next to the similarity score. FIG. 6B is a chart of similarity scores versus dimensions of the latent space for AE and β VAE. The β value is shown in parentheses next to the latent dimensionality.

Although embodiments or aspects have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment.

What is claimed is:

1. A computer-implemented method for generating a compressed representation of embedding vector data, comprising:

receiving, with at least one processor, the embedding vector data comprising a plurality of embedding vectors;

training, with at least one processor, a beta-variational autoencoder based on the embedding vector data and a loss equation, the beta-variational autoencoder comprising an encoder network, a latent layer, and a decoder network, the loss equation comprising a first term associated with reconstruction of an input by the beta-variational autoencoder, a second term associated with regularization of a latent space of the latent layer, and a hyperparameter weight associated with a ratio of the first term and the second term, wherein the latent space has a plurality of dimensions;

determining, with at least one processor, a respective mean of each respective dimension of the plurality of dimensions, wherein determining the respective mean of each respective dimension of the plurality of dimensions comprises determining a respective entropy of the respective mean of each respective dimension of the plurality of dimensions;

determining whether each respective dimension of the plurality of dimensions comprises a useful dimension or a deprecated dimension based on the respective mean for the respective dimension, wherein the respective entropy of the respective mean for each useful dimension is higher than a threshold, and wherein the respective entropy of the respective mean for each deprecated dimension is lower than the threshold;

determining, with at least one processor, a first subset of the plurality of dimensions based on the respective mean for each respective dimension of the plurality of dimensions, wherein the first subset of the plurality of dimensions comprises useful dimensions;

discarding, with at least one processor, a second subset of the plurality of dimensions based on the respective mean of each respective dimension of the plurality of dimensions, wherein the second subset of the plurality of dimensions is different than the first subset of the plurality of dimensions, wherein the second subset of the plurality of dimensions comprises deprecated dimensions, and wherein discarding the second subset of the plurality of dimensions reduces a dimensionality of the latent space;

generating, with at least one processor, the compressed representation of the embedding vector data based on the first subset of dimensions; and inputting, with at least one processor, the compressed representation of the embedding vector data into at least one machine learning model.

2. The computer-implemented method of claim 1, wherein determining the respective mean of each respective dimension of the plurality of dimensions comprises:

determining a respective entropy of the respective mean of each respective dimension of the plurality of dimensions; and wherein training the beta-variational autoencoder comprises:

iteratively adjusting the hyperparameter weight and repeating the training, the determining of the respective entropy of the respective mean, the determining of the first subset, the discarding of the second subset, and the generating of the compressed representation.

3. The computer-implemented method of claim 1, wherein the first subset of the plurality of dimensions comprises each useful dimension, and wherein the second subset of the plurality of dimensions comprises each deprecated dimension.

4. The computer-implemented method of claim 1, wherein determining the respective mean of each respective dimension of the plurality of dimensions comprises:

determining, with at least one processor, a respective entropy of the respective mean of each respective dimension of the plurality of dimensions; and wherein determining the first subset of the plurality of dimensions comprises:

determining, with at least one processor, the first subset of the plurality of dimensions based on the respective entropy of the respective mean for each respective dimension of the plurality of dimensions.

5. The computer-implemented method of claim 4, wherein discarding the second subset of the plurality of dimensions comprises:

discarding the second subset of the plurality of dimensions based on the respective entropy of the respective mean of each respective dimension of the plurality of dimensions.

6. The computer-implemented method of claim 1, wherein the loss equation is:

$$\mathcal{L} = \sum_{i=1}^{n} (x_i - \hat{x}_i)^2 + \beta \sum_{i=1}^{m} D_{KL}\left(\mathcal{N}\left(\mu_i, \sigma_i^2\right) \| \mathcal{N}(0, 1)\right);$$

wherein the first term associated with reconstruction of an input by the beta-variational autoencoder is:

$$\sum_{i=1}^{n} (x_i - \hat{x}_i)^2;$$

wherein the second term associated with regularization of the latent space of the latent layer is:

$$\sum_{i=1}^{m} D_{KL}\left(\mathcal{N}\left(\mu_i, \sigma_i^2\right) \| \mathcal{N}(0, 1)\right);$$

wherein $x_i$ is the input and $\hat{x}_i$ is a reconstruction of the input provided by the beta-variational autoencoder;

wherein $D_{KL}$ is a function for a Kullback-Leibler divergence;

wherein $\mathcal{N}$ is a function for a normal distribution; and wherein the hyperparameter weight associated with the ratio of the first term and the second term is $\beta$.

7. A system for generating a compressed representation of embedding vector data comprising at least one processor programmed or configured to:

receive the embedding vector data comprising a plurality of embedding vectors;

train a beta-variational autoencoder based on the embedding vector data and a loss equation, the beta-variational autoencoder comprising an encoder network, a latent layer, and a decoder network, the loss equation comprising a first term associated with reconstruction of an input by the beta-variational autoencoder, a second term associated with regularization of a latent space of the latent layer, and a hyperparameter weight associated with a ratio of the first term and the second term, wherein the latent space has a plurality of dimensions;

determine a respective mean of each respective dimension of the plurality of dimensions, wherein, when determining the respective mean of each respective dimension of the plurality of dimensions, the at least one processor is programmed or configured to:

determine a respective entropy of the respective mean of each respective dimension of the plurality of dimensions;

determine whether each respective dimension of the plurality of dimensions comprises a useful dimension or a deprecated dimension based on the respective mean for the respective dimension, wherein the respective entropy of the respective mean for each useful dimension is higher than a threshold, and wherein the respective entropy of the respective mean for each deprecated dimension is lower than the threshold;

determine a first subset of the plurality of dimensions based on the respective mean for each respective dimension of the plurality of dimensions, wherein the first subset of the plurality of dimensions comprises useful dimensions;

discard a second subset of the plurality of dimensions based on the respective mean of each respective dimension of the plurality of dimensions;

generate the compressed representation of the embedding vector data based on the first subset of dimensions; and input the compressed representation of the embedding vector data into at least one machine learning model.

8. The system of claim 7, wherein, when determining the respective mean of each respective dimension of the plurality of dimensions, the at least one processor is programmed or configured to:

determine a respective entropy of the respective mean of each respective dimension of the plurality of dimensions; and wherein, when training the beta-variational autoencoder, the at least one processor is programmed or configured to:

iteratively adjust the hyperparameter weight and repeat the training, the determining of the respective entropy of the respective mean, the determining of the first subset, the discarding of the second subset, and the generating of the compressed representation.

9. The system of claim 7, wherein the first subset of the plurality of dimensions comprises each useful dimension, and wherein the second subset of the plurality of dimensions comprises each deprecated dimension.

10. The system of claim 7, wherein, when determining the respective mean of each respective dimension of the plurality of dimensions, the at least one processor is programmed or configured to:

determine a respective entropy of the respective mean of each respective dimension of the plurality of dimensions; and wherein, when determining the first subset of the plurality of dimensions, the at least one processor is programmed or configured to:

determine the first subset of the plurality of dimensions based on the respective entropy of the respective mean for each respective dimension of the plurality of dimensions.

11. The system of claim 10, wherein, when discarding the second subset of the plurality of dimensions, the at least one processor is programmed or configured to:

discard the second subset of the plurality of dimensions based on the respective entropy of the respective mean of each respective dimension of the plurality of dimensions.

12. The system of claim 7, wherein the loss equation is:

$$\mathcal{L} = \sum_{i=1}^{n}(x_i - \hat{x}_i)^2 + \beta \sum_{i=1}^{m} D_{KL}\left(\mathcal{N}(\mu_i, \sigma_i^2) \| \mathcal{N}(0, 1)\right)$$

wherein the first term associated with reconstruction of an input by the beta-variational autoencoder is:

$$\sum_{i=1}^{n}(x_i - \hat{x}_i)^2;$$

wherein the second term associated with regularization of the latent space of the latent layer is:

$$\sum_{i=1}^{m} D_{KL}\left(\mathcal{N}(\mu_i, \sigma_i^2) \| \mathcal{N}(0, 1)\right);$$

wherein $x_i$ is the input and $\hat{x}_i$ is a reconstruction of the input provided by the beta-variational autoencoder;

wherein $D_{KL}$ is a function for a Kullback-Leibler divergence;

wherein $\mathcal{N}$ is a function for a normal distribution; and wherein the hyperparameter weight associated with the ratio of the first term and the second term is $\beta$.

13. A computer program product for generating a compressed representation of embedding vector data, the computer program product comprising at least one non-transitory computer readable medium including one or more instructions that, when executed by at least one processor, cause the at least one processor to:

receive the embedding vector data comprising a plurality of embedding vectors;

train a beta-variational autoencoder based on the embedding vector data and a loss equation, the beta-variational autoencoder comprising an encoder network, a latent layer, and a decoder network, the loss equation comprising a first term associated with reconstruction of an input by the beta-variational autoencoder, a second term associated with regularization of a latent space of the latent layer, and a hyperparameter weight associated with a ratio of the first term and the second term, wherein the latent space has a plurality of dimensions;

determine a respective mean of each respective dimension of the plurality of dimensions, wherein, when determining the respective mean of each respective dimension of the plurality of dimensions, the one or more instructions cause the at least one processor to:

determine a respective entropy of the respective mean of each respective dimension of the plurality of dimensions;

determine whether each respective dimension of the plurality of dimensions comprises a useful dimension or a deprecated dimension based on the respective mean for the respective dimension, wherein the respective entropy of the respective mean for each useful dimension is higher than a threshold, and wherein the respective entropy of the respective mean for each deprecated dimension is lower than the threshold;

determine a first subset of the plurality of dimensions based on the respective mean for each respective dimension of the plurality of dimensions, wherein the first subset of the plurality of dimensions comprises useful dimensions;

discard a second subset of the plurality of dimensions based on the respective mean of each respective dimension of the plurality of dimensions, wherein the second subset of the plurality of dimensions is different than the first subset of the plurality of dimensions, wherein the second subset of the plurality of dimensions comprises deprecated dimensions, and wherein discarding the second subset of the plurality of dimensions reduces a dimensionality of the latent space;

generate the compressed representation of the embedding vector data based on the first subset of dimensions; and input the compressed representation of the embedding vector data into at least one machine learning model.

14. The computer program product of claim 13, wherein, when determining the respective mean of each respective dimension of the plurality of dimensions, the one or more instructions cause the at least one processor to:

determine a respective entropy of the respective mean of each respective dimension of the plurality of dimensions; and wherein, when training the beta-variational autoencoder, the one or more instructions further cause the at least one processor to:

iteratively adjust the hyperparameter weight and repeat the training, the determining of the respective entropy of the respective mean, the determining of the first subset, the discarding of the second subset, and the generating of the compressed representation.

15. The computer program product of claim 13, wherein the first subset of the plurality of dimensions comprises each useful dimension, and wherein the second subset of the plurality of dimensions comprises each deprecated dimension.

16. The computer program product of claim 13, wherein, when determining the respective mean of each respective dimension of the plurality of dimensions, the one or more instructions cause the at least one processor to:

determine a respective entropy of the respective mean of each respective dimension of the plurality of dimensions; and wherein, when determining the first subset of the plurality of dimensions, the one or more instructions cause the at least one processor to:

determine the first subset of the plurality of dimensions based on the respective entropy of the respective mean for each respective dimension of the plurality of dimensions.

17. The computer program product of claim 16, wherein, when discarding the second subset of the plurality of dimensions, the one or more instructions cause the at least one processor to:

discard the second subset of the plurality of dimensions based on the respective entropy of the respective mean of each respective dimension of the plurality of dimensions.

18. The computer program product of claim 13, wherein the loss equation is:

$$\mathcal{L} = \sum_{i=1}^{n}(x_i - \hat{x}_i)^2 + \beta\sum_{i=1}^{m}D_{KL}\big(\mathcal{N}\big(\mu_i, \sigma_i^2\big)\|\mathcal{N}(0, 1)\big)$$

wherein the first term associated with reconstruction of an input by the beta-variational autoencoder is:

$$\sum_{i=1}^{n}(x_i - \hat{x}_i)^2;$$

wherein the second term associated with regularization of the latent space of the latent layer is:

$$\sum_{i=1}^{m}D_{KL}\big(\mathcal{N}\big(\mu_i, \sigma_i^2\big)\|\mathcal{N}(0, 1)\big);$$

wherein $x_i$ is the input and $\hat{x}_i$ is a reconstruction of the input provided by the beta-variational autoencoder;

wherein $D_{KL}$ is a function for a Kullback-Leibler divergence;

wherein $\mathcal{N}$ is a function for a normal distribution; and wherein the hyperparameter weight associated with the ratio of the first term and the second term is $\beta$.

* * * * *